US011319052B2

United States Patent
Warren et al.

(10) Patent No.: US 11,319,052 B2
(45) Date of Patent: May 3, 2022

(54) LEADING-EDGE ARRANGEMENT FOR A FLOW BODY OF A VEHICLE

(71) Applicant: Airbus Operations GmbH, Hamburg (DE)

(72) Inventors: Anthony Warren, Hamburg (DE); Marco Biondini, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 577 days.

(21) Appl. No.: 16/197,635

(22) Filed: Nov. 21, 2018

(65) Prior Publication Data

US 2019/0161159 A1 May 30, 2019

(30) Foreign Application Priority Data

Nov. 30, 2017 (DE) .......................... 102017128497.4

(51) Int. Cl.
*B64C 3/26* (2006.01)
*B64C 3/22* (2006.01)
(Continued)

(52) U.S. Cl.
CPC .................. *B64C 3/26* (2013.01); *B32B 3/12* (2013.01); *B32B 7/12* (2013.01); *B32B 15/08* (2013.01); *B32B 15/20* (2013.01); *B64C 3/20* (2013.01); *B64C 3/22* (2013.01); *B64F 5/10* (2017.01); *B32B 2250/02* (2013.01); *B32B 2605/18* (2013.01); *B64C 2003/146* (2013.01)

(58) Field of Classification Search
CPC ..................................... B64C 3/22; B64C 3/26
See application file for complete search history.

(56) References Cited

U.S. PATENT DOCUMENTS 1,553,695 A * 9/1925 Junkers ...................... B64C 3/26
244/123.12
1,753,823 A * 4/1930 Dornier ...................... B64C 3/26
244/123.2
(Continued)

FOREIGN PATENT DOCUMENTS

CN 107878727 A * 4/2018 .............. B22F 10/20
CN 109334971 A * 2/2019 .............. B22F 10/20
(Continued)

OTHER PUBLICATIONS

Djukanovic, Goran. "Are Aluminium-Scandium Alloys the Future?" Aluminum Insider, Jul. 28, 2017. https://aluminiuminsider.com/aluminium-scandium-alloys-future/.*
(Continued)

*Primary Examiner* — Joseph W Sanderson
(74) *Attorney, Agent, or Firm* — Jenkins, Wilson, Taylor & Hunt, P.A.

(57) ABSTRACT

A leading-edge arrangement for a flow body has a curved skin panel having outer and inner sides, and a three-dimensional reinforcing lattice. The curvature of the outer side of the lattice corresponds to the curvature of the inner side of the skin panel. The outer side of the lattice has attachment points connected to the inner side of the skin panel. The lattice is constructed as a three-dimensional framework having a interconnected framework members that form at least one layer of interconnected three-dimensional bodies.

19 Claims, 5 Drawing Sheets

(51) Int. Cl.
    *B64F 5/10*       (2017.01)
    *B32B 3/12*       (2006.01)
    *B32B 15/08*     (2006.01)
    *B32B 15/20*     (2006.01)
    *B32B 7/12*       (2006.01)
    *B64C 3/20*      (2006.01)
    *B64C 3/14*      (2006.01)

(56) References Cited

U.S. PATENT DOCUMENTS

| | | | | |
|---|---|---|---|---|
| 2,650,780 | A * | 9/1953 | Northrop | B64C 39/10 244/13 |
| 7,837,919 | B2 * | 11/2010 | Gardner | B32B 3/263 264/257 |
| 8,245,972 | B2 * | 8/2012 | Capasso | B32B 15/14 244/123.13 |
| 8,276,847 | B2 * | 10/2012 | Manz | B64C 3/28 244/123.1 |
| 8,602,356 | B2 * | 12/2013 | Maenz | B64C 3/00 244/123.4 |
| 9,321,241 | B2 * | 4/2016 | Doty | B64C 3/20 |
| 9,511,848 | B2 * | 12/2016 | Gerber | B64C 21/06 |
| 10,183,736 | B2 * | 1/2019 | Doty | B64C 1/06 |
| 10,358,821 | B2 * | 7/2019 | Cawthorne | B29C 66/72 |
| 10,556,670 | B2 * | 2/2020 | Koppelman | B64C 3/26 |
| 2003/0146346 | A1 | 8/2003 | Chapman, Jr. | |
| 2009/0294590 | A1 * | 12/2009 | Maenz | B64C 3/22 244/123.4 |
| 2010/0140405 | A1 * | 6/2010 | Capasso | B64C 3/28 244/123.13 |
| 2010/0148007 | A1 * | 6/2010 | Manz | B64C 5/02 244/123.1 |
| 2013/0303067 | A1 * | 11/2013 | Doty | B32B 3/28 454/76 |
| 2014/0021304 | A1 * | 1/2014 | Gerber | B64C 3/26 244/35 R |
| 2014/0302261 | A1 * | 10/2014 | Cheung | E04C 1/00 428/33 |
| 2015/0048207 | A1 * | 2/2015 | Williams | B64C 3/18 244/123.7 |
| 2016/0159465 | A1 * | 6/2016 | Koppelman | B64C 21/06 244/209 |
| 2016/0194070 | A1 * | 7/2016 | Doty | B64C 3/26 244/123.1 |
| 2016/0257396 | A1 * | 9/2016 | Cawthorne | B29D 99/0028 |
| 2018/0312239 | A1 * | 11/2018 | Velez De Mendiz Bal Alonso | B32B 27/08 |
| 2019/0092450 | A1 * | 3/2019 | Williams | B64C 3/24 |

FOREIGN PATENT DOCUMENTS

| | | | |
|---|---|---|---|
| DE | 102010006144 B4 | 9/2013 | |
| EP | 2196309 A1 | 6/2010 | |
| EP | 2662207 A1 | 11/2013 | |
| EP | 3205575 A1 | 8/2017 | |
| FR | 2918036 A1 | 1/2009 | |
| GB | 2379628 A * | 3/2003 | B22C 1/18 |
| WO | 2011128069 A1 | 10/2011 | |
| WO | 2013079918 A1 | 6/2013 | |

OTHER PUBLICATIONS

European Search Report for Application No. 18206921.1 dated Mar. 28, 2019.

European Office Action for Application No. 18206921.1 dated Apr. 16, 2020.

* cited by examiner

LEADING-EDGE ARRANGEMENT FOR A FLOW BODY OF A VEHICLE

CROSS-REFERENCE TO PRIORITY APPLICATION

This application claims the benefit of, and priority to, German patent application number DE 10 2017 128497.4, filed Nov. 30, 2017. The content of the referenced application is incorporated by reference herein.

TECHNICAL FIELD

Embodiments of the subject matter described herein relate generally to a leading-edge arrangement for a flow body of a vehicle, to a method for producing such a leading-edge arrangement, and to a vehicle, in particular an aircraft, having a flow body and such a leading-edge arrangement.

BACKGROUND

Leading edges of flow bodies are subjected to aerodynamic loading which depends on the type and use of the flow body. The leading edges furthermore face directly towards the flow and cause the flow to be split into two parts that follow the surfaces of the flow body. Since flow bodies are also often subject to the requirement for lightweight construction, for example in aircraft or wind turbines, the leading edges—like the majority of the flow body itself—are often substantially hollow. In order to ensure a largely unchanged shape of the leading edge, a sufficiently stable construction is necessary.

It is known practice to use a multiplicity of spaced-apart ribs in leading edges, said ribs bearing a curved skin panel and ensuring a sufficient distribution of forces upon external loading. Furthermore, when designing the construction of a leading edge, the case of loading on account of bird strike is also taken into consideration.

Patent publication DE 10 2010 006 144 B4 shows a fairing for a structure of an aircraft, in particular for nose parts of the vertical stabilizer, tailplane or wings of the aircraft, which said fairing having a supporting structure with ribs.

BRIEF SUMMARY

There may generally be a need to provide a leading-edge arrangement on relatively large flow bodies that is robust and at the same time has as low a weight as possible.

Accordingly, the object of the disclosure is to propose a leading-edge arrangement for a flow body, said leading-edge arrangement having as low a weight as possible but also being at least just as rigid as conventional leading-edge arrangements.

This object is achieved by a leading-edge arrangement having the features of independent Claim 1. Advantageous developments and embodiments can be gathered from the dependent claims and the following description.

A leading-edge arrangement for a flow body is proposed, said leading-edge arrangement having a curved skin panel having a skin-panel outer side and a skin-panel inner side, and a three-dimensional reinforcing lattice having a lattice outer side. The curvature of the lattice outer side corresponds to the curvature of the skin-panel inner side. The lattice outer side has a multiplicity of attachment points, which are connected to the skin-panel inner side. The reinforcing lattice is constructed as a three-dimensional framework having a multiplicity of interconnected framework members, which form at least one layer of interconnected three-dimensional bodies.

Consequently, the leading-edge arrangement according to the disclosure includes two main components. While the curved skin panel may correspond to a conventional skin panel for providing the outer surface, the three-dimensional reinforcing lattice is a particularly advantageous addition as an alternative to a conventional rib.

The reinforcing lattice is a three-dimensional framework that includes a multiplicity of framework members, the end points of which are each connected to end points of other framework members. Several framework members form a cohesive three-dimensional body as a kind of basic form or lattice element. The reinforcing lattice of the leading-edge arrangement according to the disclosure includes several basic forms or lattice elements of this type, which are arranged in a row and are connected together. The reinforcing lattice forms a cohesive layer of the cohesive lattice elements, wherein this layer follows the contour of the skin-panel inner side.

A basic form or a lattice element could for instance be a pyramid made up of a total of four triangles. These triangles can be equilateral, isosceles or irregular triangles, wherein the sides each include one framework member. It is appropriate to use isosceles triangles at least in part and sometimes also equilateral triangles, in order to allow a distribution of forces in all spatial directions. Several pyramid forms of this type can adjoin one another with varying orientations in order to form one or more layers. However, it is also possible to use any other known geometric basic forms for this purpose, in order to form such a layer. This at least one layer follows the curvature of the skin-panel inner side. This means that the reinforcing lattice formed in such a way can be brought into flush surface contact with the skin-panel inner side.

The attachment points of the reinforcing lattice can be realized in various ways, which allow attachment in particular of junction points to the skin-panel inner side. For example, the attachment points could have substantially planar faces which can be brought into flush contact with the skin-panel inner side. These planar faces, which could be interpreted as bearing feet, can be realized for example in a junction point or at a junction point between two framework members.

Overall, as a result of the attachment of a reinforcing lattice to a skin-panel inner side, particularly advantageous reinforcement of a curved skin panel can be achieved. It is conceivable to provide narrow reinforcing lattices in the form of strips, which can replace conventional ribs. These are then arranged for instance at positions spaced apart from one another along the leading edge. Alternatively, a reinforcing lattice can also extend continuously along the leading edge over a relatively large area of the skin panel.

Depending on the type and configuration of the flow body, it is also possible for more than just one layer of interconnected three-dimensional bodies to be used. It is conceivable to use more than one layer of interconnected lattice elements for narrow reinforcing lattices in the form of strips. In the case of reinforcing lattices extending continuously over a relatively large area, however, single layers or only a few layers may also suffice.

In an advantageous embodiment, the skin panel is produced from a fibre-reinforced plastic. This can exhibit for example a thermosetting matrix material with reinforcing fibres embedded therein. The reinforcing fibres can comprise in particular carbon fibres, glass fibres, aramid fibres and Kevlar fibres.

As an alternative, thermoplastic matrix materials are also conceivable. These can comprise for example PA (polyamide), PPS (polyphenylene sulfide), PEI (polyetherimide), PEEK (polyether ether ketone), PEKK (polyether ketone ketone) or the like. In this way, the underlying, curved skin panel is already sufficiently stable with relatively small thicknesses. For tail units of commercial aircraft, skin thicknesses of much less than 5 mm and in particular in the region of 4 mm, 3 mm or less may thus be sufficient.

The reinforcing lattice is preferably constructed from a metal material. The metal material can consequently differ from the material from which the skin panel is produced. The combination of skin panel and reinforcing lattice can thus combine the advantages of two different types of material. The forming of a framework structure from a metal material results in better absorption of compressive forces which act on the reinforcing lattice from the skin.

The metal material may be a metal alloy which includes at least aluminum, magnesium and scandium. This metal alloy may be used to produce high-strength and durable components and has an advantageous density.

In an advantageous embodiment, the reinforcing lattice is used as an antenna. This can be used for various communications and navigation purposes. The antenna can furthermore be a single antenna or an antenna array. Therefore, during the production of the reinforcing lattice from a metal material, weight can be saved which would otherwise arise on account of a separate antenna. The antenna is connectable to an electronic unit.

The reinforcing lattice may furthermore be produced by an additive manufacturing method. The reinforcing lattice is consequently of monolithic construction, and so no individual, separate framework members are connected together via corresponding connecting means or connecting methods. Rather, on account of the additive manufacturing method, the reinforcing lattice can have a weight-optimized construction. In particular, given such a manufacturing method, it is possible for the framework members not to be designed in a solid manner but in a manner provided with a cavity. This is appropriate particularly for use in an aircraft.

The additive manufacturing method relates in particular to a generative layer-building method for producing a three-dimensional object. The method can be realized by stereolithography, selective laser melting or any other 3D printing or manufacturing method (ALM method). When metal material is used, such a method can include for instance the successive application of a layer of pulverulent material to a carrier and the selective melting of only one region of the layer in question. Material can then melt locally and be combined with the layer located underneath, and subsequently cool and solidify. Subsequently, a further layer of pulverulent material is applied. This method is carried out until the desired body has been produced.

Instead of a pulverulent material, use can also be made of a liquid or pasty curable material, for instance a thermoplastic or a thermoset. A thermoplastic can be liquefied by heating, be applied to a substrate in layers and be cured by cooling. When a thermoset is used, curing in layers can take place for instance by UV irradiation. The method according to the disclosure is not intended to be limited to a particular material or a particular generative manufacturing method, however.

Particularly preferably, a profile contour of the skin panel has a leading-edge region and two flanks adjoining the latter. The leading-edge region exhibits a greater curvature than the flanks. The skin panel is curved through at least 90° in the leading-edge region. This means that a tangent to an imaginary end edge of the leading-edge region changes its angle by at least 90°, when running around the leading edge, as far as an opposite imaginary end edge of the leading-edge region. The skin panel consequently actually encloses the leading edge of a flow body in terms of flow. The leading edge should be interpreted as being the boundary edge of the leading-edge arrangement which projects furthest into the flow. It can be a straight line for example in the case of a straight leading edge of a flow body. At this flow-related leading edge, the flow is divided into two halves. A region of relatively pronounced curvature is adjoined downstream by the flanks, along which the split flows ultimately run. The leading-edge region is usually curved by much more than 90°, specifically up to a region of 180°☐20°. This is dependent on the specific configuration of the flow body, however. With this configuration, it is clear, however, that in this highly curved region, the reinforcing lattice also has to rest in adapted form against the skin-panel inner side. The curvature of the lattice outer side is accordingly likewise embodied over an angular range of at least 90°.

Preferably, the reinforcing lattice is formed from a leading-edge portion and two flank portions that each adjoin the leading-edge portion. The leading-edge portion is arranged in the leading-edge region of the skin panel on the inner side thereof, and the flank portions adjoin the latter at the flanks of the skin panel. In order to make manufacturing easier, the reinforcing lattice can consequently be produced in three separate portions, which are then subsequently brought to the inner side of the skin panel. The leading-edge portion could be designed in a relatively compact manner. It is not absolutely necessary for there to be a single layer therein, rather the entire leading-edge portion could be filled with a framework-like structure. The flank portions, by contrast, can be constructed from a single layer and adjoin the leading-edge portion in a manner flush therewith.

The reinforcing lattice may furthermore form several layers of interconnected three-dimensional bodies, which fill at least two-thirds of the space enclosed by the skin panel. In this way, substantially the entire leading-edge arrangement is filled with a reinforcing lattice. In this case, certain regions can remain left out which are necessary for instance for fastening the leading-edge arrangement to a superordinate component of the flow body. These can be surface flanges, frames or other portions suitable for connection. It is conceivable for the lengths of the individual framework members, in such a configuration, to be greater than in the case of reinforcing lattices embodied in a single layer. The leading-edge arrangement has a very high strength in this construction.

The disclosure also relates to a method for producing a leading-edge arrangement, having the steps of providing a curved skin panel having a skin-panel outer side and a skin-panel inner side in a mould, placing a three-dimensional reinforcing lattice onto the skin-panel inner side in the mould, and connecting the skin panel and the reinforcing lattice. The connection of the skin panel and the reinforcing lattice may involve joining by material bonding. Depending on the material design of the skin panel, joining by material bonding can comprise adhesive bonding or the joint curing of a skin panel with attachment points that pass into the material of the skin panel, or the like.

The provision of the skin panel may comprise the arranging of layers of reinforcing fibres and of a matrix material and subsequent curing. The connection of the reinforcing lattice can in this case take place by the curing of the skin panel, while the attachment points are located in the matrix material. Alternatively, the connection can also take place by adhesive bonding or other material bonding methods.

As already mentioned above, the provision of the reinforcing lattice may comprise the (additive) construction of the reinforcing lattice in layers. In this case, all generative manufacturing methods are conceivable.

The construction may comprise the construction of the reinforcing component in layers from a pulverulent metal material. The material can include in particular a metal alloy which includes at least the elements aluminum, magnesium and scandium.

The disclosure also relates to a vehicle having at least one flow body having a leading-edge arrangement according to the above description. The vehicle may be an aircraft, wherein the flow body is a tail unit or a wing. The vehicle may also have an electronic unit. This can be connected to the reinforcing lattice or a portion of the reinforcing lattice such that the reinforcing lattice acts as an antenna.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure are apparent from the following description of the exemplary embodiments and the figures. Here, all the features that are described and/or depicted form the subject matter of the disclosure on their own and in any desired combination, even when considered independently of their combination in the individual claims or the back-references thereof. Moreover, in the figures, identical reference signs stand for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
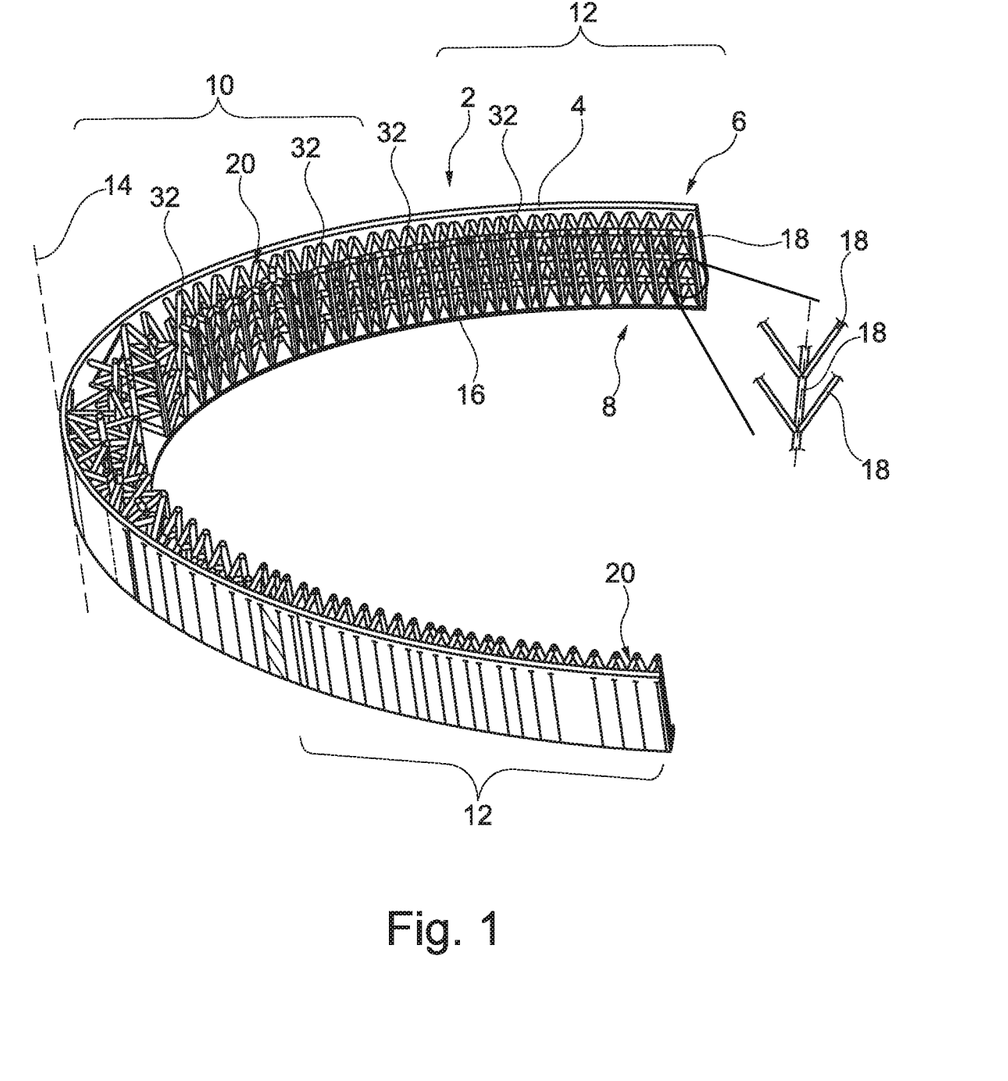
FIG. 1 shows a three-dimensional view from the inside of a leading-edge arrangement.

FIG. 1 shows a leading-edge arrangement 2 for a flow body. For example, only an excerpt thereof is illustrated here. It is conceivable however, for the leading-edge arrangement to extend over a much greater section than illustrated here.

The leading-edge arrangement 2 has a curved skin panel 4 with a skin-panel outer side 6 and a skin-panel inner side 8. The skin panel 4 has a leading-edge region 10 and two flanks 12 adjoining the latter. The leading-edge region 10 comprises the actual leading edge 14, which, from the point of view of flow, is a line which projects furthest into a flow. At this leading edge 14, the flow can be split such that some of the flow striking the leading-edge region 10 is deflected onto one side of the flow body and the rest is deflected onto the other side. The stagnation point, as it is known, can be located at the leading edge 14.

The leading-edge region 10 has a pronounced curvature. This region is curved through more than 90°. The flank regions 12 adjoining the latter are curved to a much lesser extent.

The leading-edge arrangement 2 is illustrated symmetrically here, and so it can be in particular a guide body and in particular the leading edge of a vertical stabilizer. However, embodiments of the invention are not limited to such an arrangement.

Arranged on the inner side 8 of the skin panel 4 is a reinforcing lattice 16, which is embodied in the form of a three-dimensional framework having a multiplicity of interconnected framework members 18. The framework members 18 can form three-dimensional bodies, for example in the form of pyramids or other geometric forms, which are connected together. In the illustration shown in FIG. 1, several rows of identical bodies are arranged in rows, and these form for example a layer on the skin-panel inner side.

The framework members 18 are preferably not produced separately and subsequently connected together but rather are produced entirely in one piece, or monolithically, in the arrangement thereof that is shown. This takes place preferably in an ALM manufacturing method, that is to say a generative layer-wise building method. As a result, the reinforcing lattice has a high strength and a particularly low weight, since separate connecting means are not required and the framework members 18 may continue to be embodied in a hollow manner. The reinforcing lattice 16 is preferably attached to the skin-panel inner side 8 in a materially bonded manner. To this end, a lattice outer side 20 is for example adhesively bonded to the skin-panel inner side 8.

Figure 2:
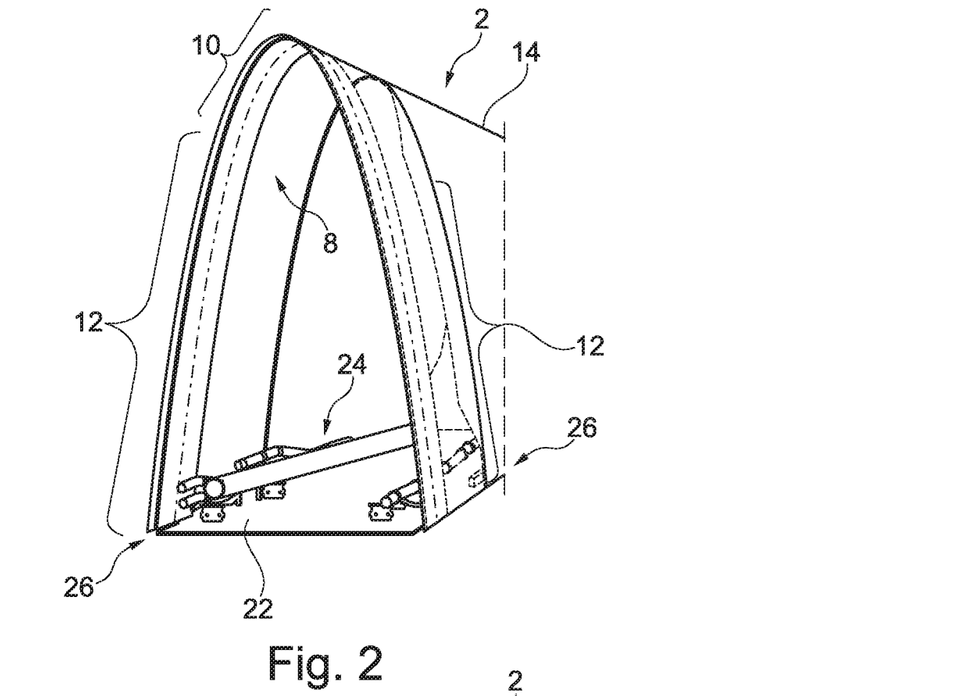
FIG. 2 shows a detail of the leading-edge arrangement without a reinforcing lattice.

FIG. 2 shows by way of example the attachment of the leading-edge arrangement 2 to a spar 22 on which several devices 24 are fitted on a side directed towards the leading edge 14. It will be understood that the reinforcing lattice 16 that is not shown in this illustration should only be arranged on the skin-panel inner side 8 such that the function of these devices 24 is not impaired. Moreover, the skin panel 4 has an attachment region 26 which is provided for connecting to the spar 22 or another skin.

The reinforcing lattice can be realized in the form of several spaced-apart, relatively narrow strips, which extend locally over the skin-panel inner side 8. Such a strip could, in the case of a leading edge of a vertical stabilizer, have for example a width of 400 mm or even much less. For example, this could be in a central region of the corresponding leading edge and locally support the skin or the skin panel 4. However, any variants in which one or more reinforcing lattices are used are conceivable. One such could also extend over substantial regions of the leading edge or even over substantially the entire leading edge.

Figure 3:
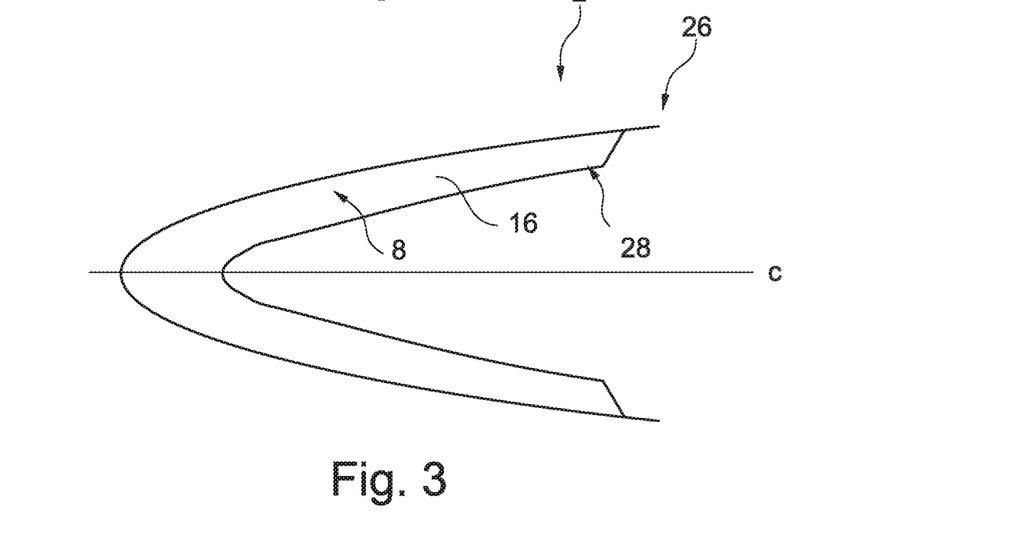
FIGS. 3 and 4 show examples of possible extensions of a reinforcing lattice.

FIG. 3 shows by way of example an extension area 28 for the reinforcing lattice 16 (indicated in a simplified manner) within the profile of the leading-edge arrangement 2. The illustration shows for example a plan view of a plane which is parallel to the direction of flow and/or to a chord c. The reinforcing lattice 16 can extend over a relatively narrow region of the profile on the skin-panel inner side 8, for example in one, two, three or a few layers. The overall contour of the reinforcing lattice 16 therefore follows the contour of the skin-panel inner side 8.

Figure 4:
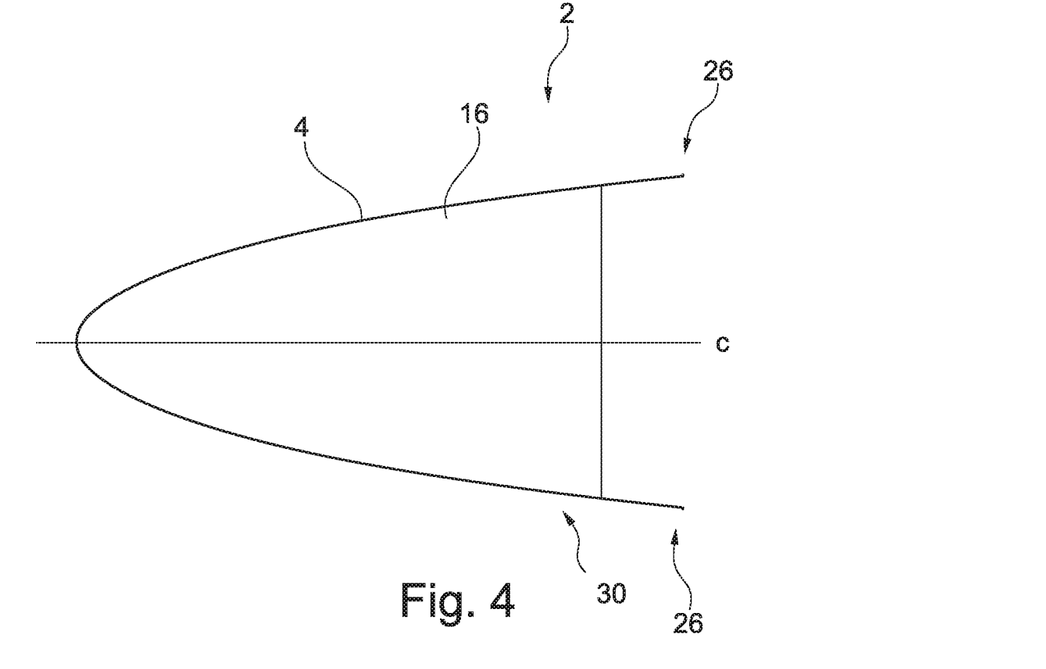

Alternatively, as shown in FIG. 4, a larger extension area 30 can be formed within the profile of the leading-edge arrangement 2. In this case, the reinforcing lattice 16 extends over a substantial region of the space enclosed by the skin panel 4. The connection regions 26 are largely left out, however. This consequently results in a clearly reinforced plate in the interior of a flow body similar to a rib, but with a much more advantageous weight.

Figure 5:
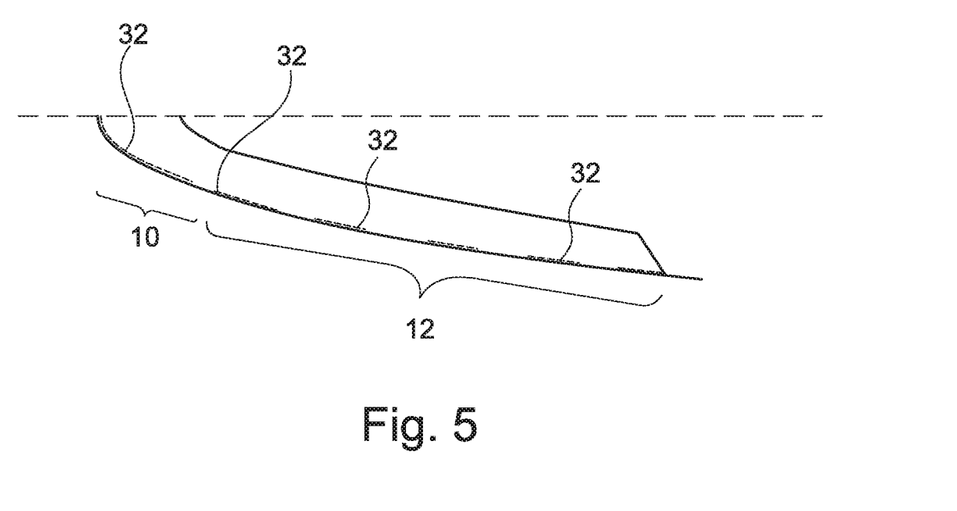
FIG. 5 illustrates attachments of the reinforcing lattice to the skin panel.

FIG. 5 furthermore shows a plurality of attachment points 32 distributed by way of example on the skin-panel inner side 8. For example, several groups of attachment points 32 are shown, at or with which the reinforcing lattice 16 can be arranged. In the leading-edge region 10, on account of the greater curvature, more attachment points 32 are present than in the individual groups of attachment points 32 at the flanks 12. It is conceivable for the attachment points 32 to be realized in the form of planar feet which are connected rigidly to the reinforcing lattice 16 and are adhesively bonded to the skin-panel inner side 8.

Figure 6:
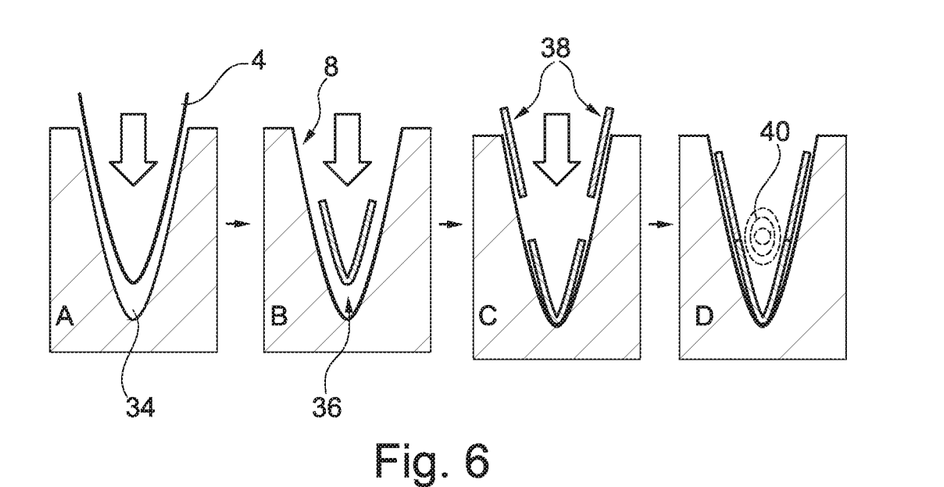
FIG. 6 schematically shows a production method for producing a leading-edge arrangement.

FIG. 6 illustrates a possible sequence of a production method for producing a leading-edge arrangement 2. In a first step A, a skin panel 4 is placed in a mould 34. This can be the introduction of a prefabricated semifinished product, for example a preimpregnated composite material (prepreg), the introduction and shaping of a metal sheet, or other variants.

In a subsequent step B, a leading-edge portion 36 of a reinforcement lattice 16 is introduced and connected to the skin-panel inner side 8. This can involve the application of an adhesive to the attachment points and the production of the subsequent surface contact with the skin panel 4.

In the subsequent step C, flank portions 38 of the reinforcing lattice 16 are introduced and likewise connected. This can be realized in the same way as in step B.

As a result of the introduction and inflation of a balloon-like pressing body 40, in order to securely connect the reinforcing lattice 16 to the skin-panel inner side 8, the pressing body 40 can be pressed against the skin-panel inner side 8. The pressure within the pressing tool 40 can be maintained until the materially bonded connection with the skin-panel inner side 8 has cured.

Between step A and step B, thickening of the leading-edge region can be achieved by introducing a further material layer. When the skin panel 4 is produced as a composite material, this can be realized by laminating on a further layer of a composite material.

Figure 7:
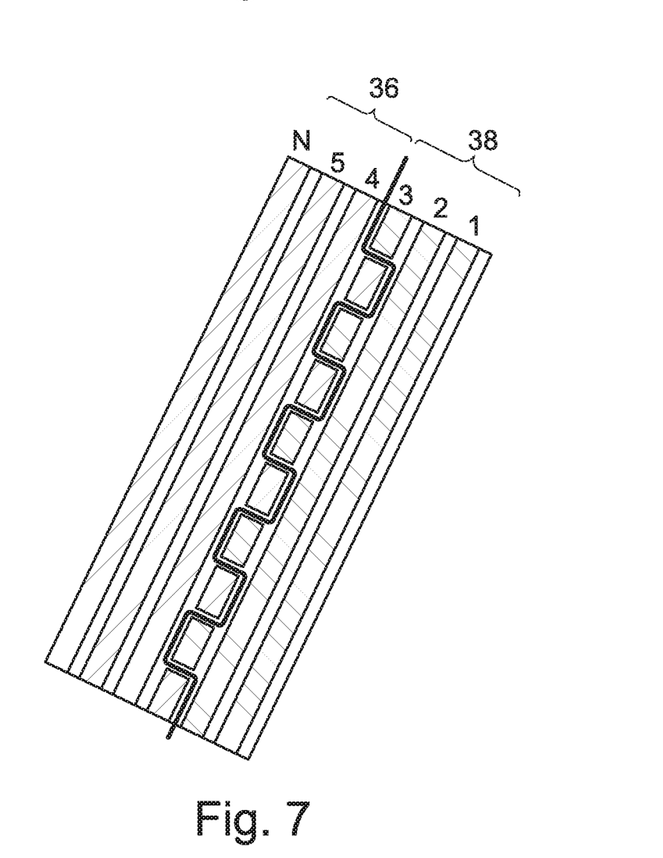
FIG. 7 shows a transition between two separate portions of a reinforcing lattice.

The subdivision, indicated in FIG. 6 and carried out for easier manufacturing, of the reinforcing lattice 16 into three portions 36 and 38 can be attached to the skin-panel inner side, as shown in FIG. 7. The strip-like portions, which are denoted by the numerals 1, 2, 3, 4, 5 and N, should be interpreted as being fastening regions of the attachment points of two portions 36 and 38 of a reinforcing lattice. Only one half of a symmetric arrangement is shown here. In a nose region directed towards the leading edge 14, the leading-edge portion 36 of the reinforcing lattice should be arranged. This can be connected to the fastening regions N, 5, 4 and partially 3. A flank portion 38 of the reinforcing lattice is connected to the fastening regions with the numerals 1, 2 and partially 3. In the fastening region with the numeral 3, the two portions 36 and 38 are connected alternately in a toothed arrangement. As a result, jumps in rigidity in the leading-edge arrangement are avoided.

Figure 8A:
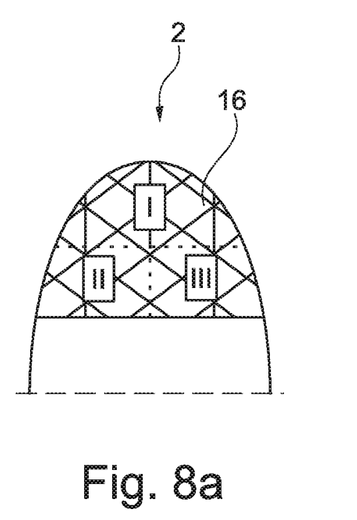
FIGS. 8a and 8b show the possibility of subdividing the reinforcing lattice.
Figure 8B:
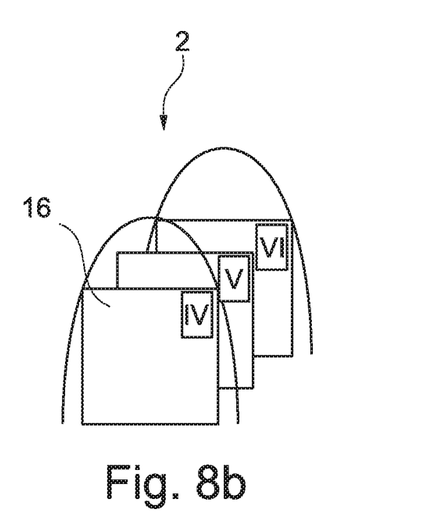

FIGS. 8a and 8b illustrate further possible subdivisions of a reinforcing lattice 16. FIG. 8a shows a reinforcing lattice 16 which takes up a relatively large proportion of the interior of a leading-edge arrangement 2. For manufacturing, the reinforcing lattice can be subdivided into three parts I, II and III. These can be connected together, for example welded, before being connected to the skin panel 4. Alternatively, separate adhesive bonding to the inner side of the skin panel 4 would also be possible.

FIG. 8b furthermore shows the subdivision into several lateral portions IV, V and VI in the direction of extension of the leading edge. The type and subdivision of the individual portions of a reinforcing lattice 16 can depend on the achievable size of a component in a generative manufacturing process.

Figure 9:
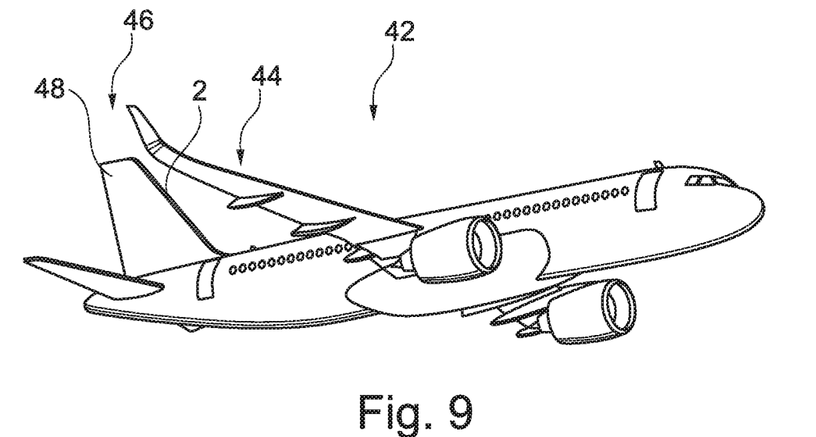
FIG. 9 shows an aircraft with a vertical stabilizer which is equipped for example with a leading-edge arrangement as described above.

Finally, FIG. 9 shows an aircraft 42, which is equipped with wings 44 and a tail unit arrangement 46. For example, the vertical stabilizer 48 of the tail unit arrangement 46 can have a leading-edge arrangement 2 as illustrated above.

In addition, it should be noted that "having" does not rule out any other elements or steps, and "a" or "an" does not rule out a multiplicity. It should furthermore be noted that features which have been described with reference to one of the above exemplary embodiments can also be used in combination with other features of other exemplary embodiments described above. Reference signs in the claims should not be considered to be limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A leading-edge arrangement for a flow body, the leading-edge arrangement comprising:
   a curved skin panel having a skin-panel outer side and a skin-panel inner side; and
   a three-dimensional reinforcing lattice that is constructed as a three-dimensional framework, which comprises a plurality of interconnected framework members forming at least one layer of interconnected three-dimensional bodies, and has a lattice outer side;
   wherein a curvature of the lattice outer side corresponds to a curvature of the skin-panel inner side;
   wherein the lattice outer side has a plurality of attachment points connected to the skin-panel inner side;
   wherein a profile contour of the skin panel has a leading-edge region and two flanks adjoining the leading-edge region;

wherein the plurality of attachment points are arranged in a plurality of groups of attachment points;

wherein more of the attachment points are located in the leading-edge region than are located in any individual group of the plurality of groups of attachment points at one of the flanks of the skin panel; and wherein adjacent groups of the plurality of attachment points are spaced apart from each other.

2. The leading-edge arrangement according to claim 1, wherein the skin panel comprises a fibre-reinforced plastic.

3. The leading-edge arrangement according to claim 1, wherein the reinforcing lattice comprises a metal material.

4. The leading-edge arrangement according to claim 3, wherein the metal material is a metal alloy comprising aluminum, magnesium, and scandium.

5. The leading-edge arrangement according to claim 1, wherein the reinforcing lattice is produced by an additive manufacturing method.

6. The leading-edge arrangement according to claim 1, wherein the flanks are respectively adjoined to opposite edges of the leading-edge region, wherein curvature of the leading-edge region is greater than curvature of the flanks, and wherein the skin panel is curved through at least 90° in the leading-edge region.

7. The leading-edge arrangement according to claim 6, wherein the reinforcing lattice is formed from a leading-edge portion and two flank portions that each adjoin the leading-edge portion, wherein the leading-edge portion is arranged in the leading-edge region of the skin panel, on an inner side thereof, and wherein the flank portions are respectively adjoined to the leading-edge portion at the flanks of the skin panel.

8. The leading-edge arrangement according to claim 1, wherein the reinforcing lattice forms several layers of interconnected three-dimensional bodies, which fill at least two-thirds of the space enclosed by the skin panel.

9. The leading-edge arrangement according to claim 1, wherein the adjacent groups of the plurality of attachment points are spaced apart from each other by a distance that is greater than a pitch between adjacent attachment points within a same group of the plurality of attachment points.

10. A vehicle comprising a flow body having a leading-edge arrangement configured in accordance with claim 1.

11. The vehicle according to claim 10, wherein the vehicle is an aircraft, and wherein the flow body is a tail unit or a wing of the aircraft.

12. A method for producing a leading-edge arrangement, the method comprising:

providing a curved skin panel in a mold, the curved skin panel comprising a skin-panel outer side and a skin-panel inner side;

producing a three-dimensional reinforcing lattice that is constructed as a three-dimensional framework, which comprises a plurality of interconnected framework members forming at least one layer of interconnected three-dimensional bodies, and has a lattice outer side;

placing the three-dimensional reinforcing lattice onto the skin-panel inner side in the mold; and connecting the skin panel and the reinforcing lattice;

wherein a curvature of the lattice outer side corresponds to a curvature of the skin-panel inner side;

wherein the lattice outer side has a plurality of attachment points connected to the skin-panel inner side;

wherein a profile contour of the skin panel has a leading-edge region and two flanks adjoining the leading-edge region;

wherein the plurality of attachment points are arranged in a plurality of groups of attachment points;

wherein more of the attachment points are located in the leading-edge region than are located in any individual group of the plurality of groups of attachment points at one of the flanks of the skin panel; and wherein adjacent groups of the plurality of attachment points are spaced apart from each other.

13. The method according to claim 12, wherein connecting the skin panel and the reinforcing lattice comprises joining by material bonding.

14. The method according to claim 12, wherein providing the skin panel comprises:

arranging layers of reinforcing fibres and a matrix material; and subsequently curing the layers of reinforcing fibers and the matrix material.

15. The method according to claim 12, wherein providing the reinforcing lattice comprises additive construction of the reinforcing lattice in layers.

16. The method according to claim 15, wherein the construction comprises the construction of the reinforcing component in layers from a pulverulent, metal material.

17. A leading-edge arrangement for a flow body, the leading-edge arrangement comprising:

a curved skin panel having a skin-panel outer side and a skin-panel inner side; and a three-dimensional reinforcing lattice that is constructed as a three-dimensional framework, which comprises a plurality of interconnected framework members forming at least one layer of interconnected three-dimensional bodies, and has a lattice outer side;

wherein a curvature of the lattice outer side corresponds to a curvature of the skin-panel inner side;

wherein the lattice outer side has a plurality of attachment points connected to the skin-panel inner side;

wherein a profile contour of the skin panel has a leading-edge region and two flanks adjoining the leading-edge region;

wherein the reinforcing lattice comprises a leading-edge portion and two flank portions, which adjoin the leading-edge portion;

wherein the leading-edge portion is arranged in the leading-edge region of the skin panel, on an inner side thereof;

wherein the flank portions are respectively adjoined to the leading-edge portion at the flanks of the skin panel; and wherein the leading-edge portion comprises a monolithic construction and each of the flank portions comprise a monolithic construction.

18. The leading-edge arrangement according to claim 17, wherein the skin-panel inner side comprises a fastening region, which is defined where a first flank portion of the two flank portions is adjoined with the leading-edge portion, and wherein the leading edge portion and the first flank portion are connected to the skin-panel inner side in an alternating, or toothed, arrangement within the fastening region.

19. The leading-edge arrangement according to claim 17, wherein the skin-panel inner side comprises a fastening region, which is defined where a first flank portion of the two flank portions is adjoined with the leading-edge portion, and wherein the interconnected framework members of the leading-edge portion and the interconnected framework members of the first flank portion are connected to the skin-panel inner side in the alternating, or toothed, arrangement within the fastening region.

* * * * *